United States Patent

[11] 3,542,046

[72] Inventor Richard D. Moan
  Livonia, Michigan
[21] Appl. No. 728,679
[22] Filed May 13, 1968
[45] Patented Nov. 24, 1970
[73] Assignee Ford Motor Company
  Dearborn, Michigan
  a corporation of Delaware

[54] FLUID PRESSURE GOVERNOR MECHANISM HAVING A GOVERNOR VALVE ORIFICE AND A CONSTANT FLOW GOVERNOR FEED CIRCUIT
2 Claims, 3 Drawing Figs.
[52] U.S. Cl.................................................... 137/54,
  74/752, 137/56, 74/864
[51] Int. Cl.................................................... G05d 13/10
[50] Field of Search........................................... 137/54, 56;
  74/752

[56] References Cited
UNITED STATES PATENTS
3,265,081 8/1966 Stockton..................... 137/54
3,279,486 10/1966 Duffy........................... 137/54

Primary Examiner—Clarence R. Gordon
Attorneys—John R. Faulkner and Donald J Harrington ABSTRACT: A control valve system for establishing automatic ratio changes in an automotive vehicle power transmission mechanism including a driven speed sensitive governor that comprises a governor orifice controlled by a centrifugally responsive valve element to produce a variable back pressure, and a pressure feed circuit which allows a constant flow across a feed orifice restriction thereby establishing a reliable speed signal in a range of high operating speed as well as in a low speed range.

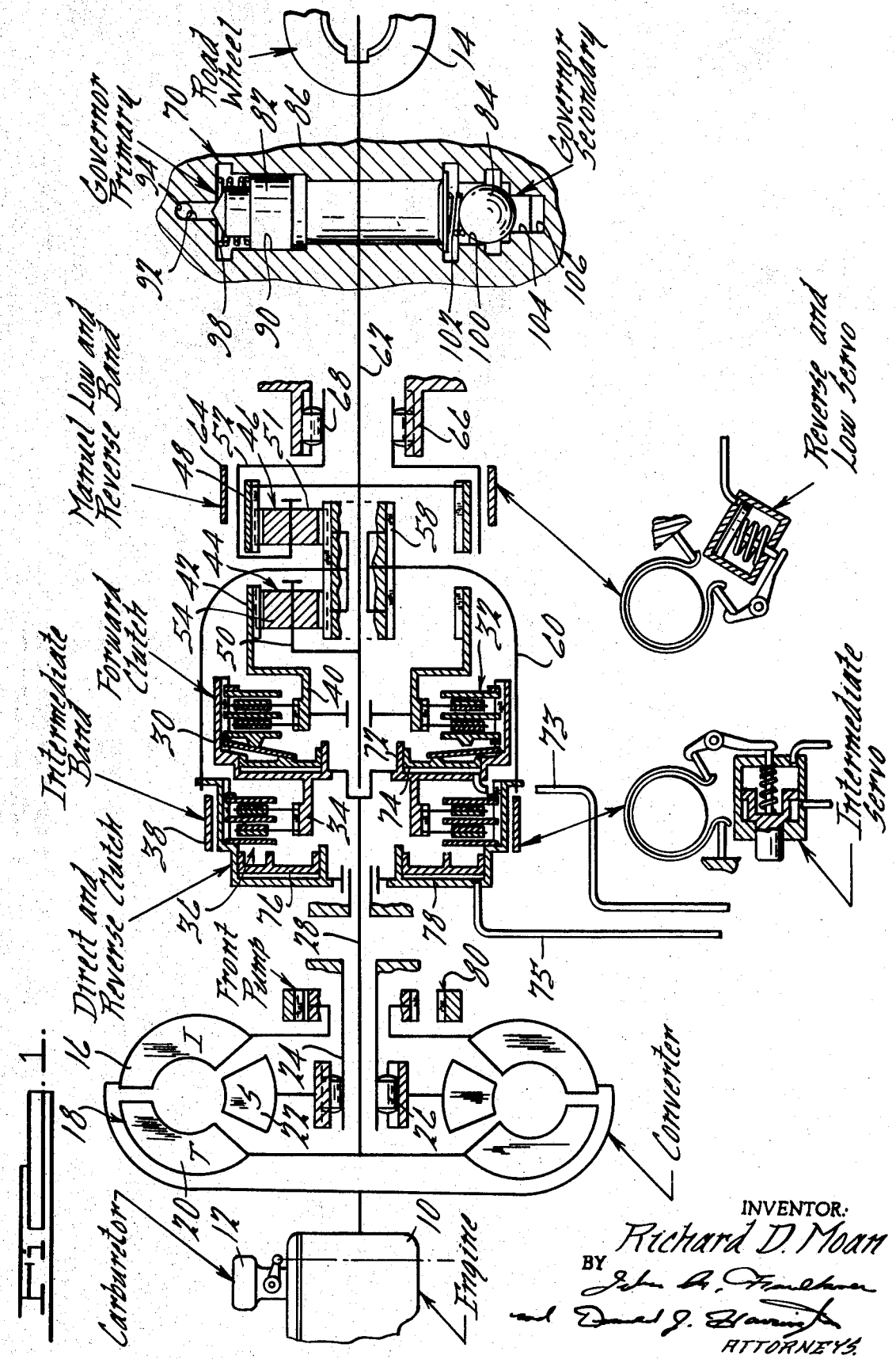

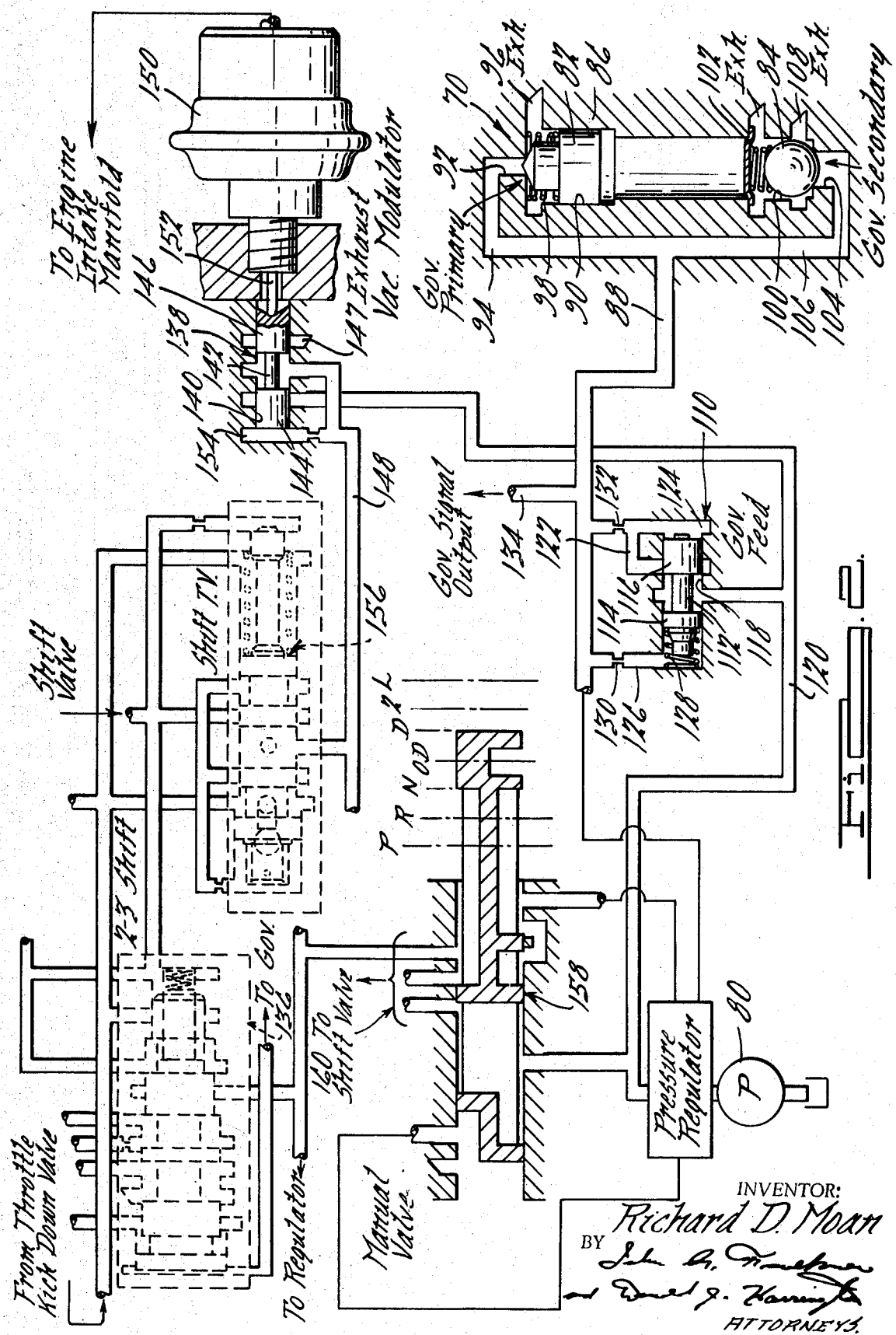

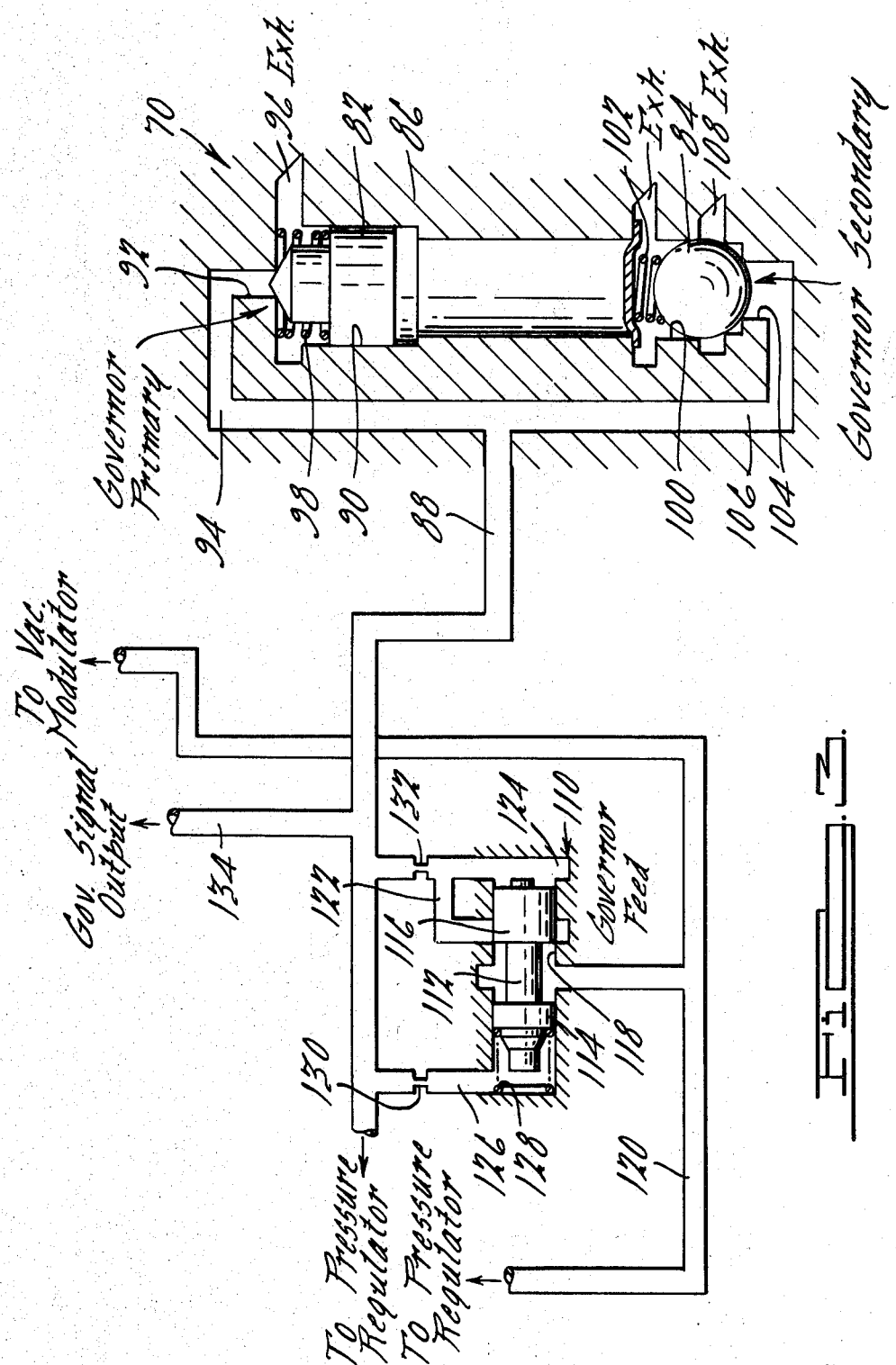

3,542,046

FLUID PRESSURE GOVERNOR MECHANISM HAVING A GOVERNOR VALVE ORIFICE AND A CONSTANT FLOW GOVERNOR FEED CIRCUIT

GENERAL DESCRIPTION OF THE INVENTION

My invention is adapted to be used in an automatic control valve circuit in an automatic power transmission system. Such systems comprise fluid pressure operated servos that are adapted to control the relative motion of gear elements in the transmission system thereby effecting automatic ratio changes. The servos are pressurized by a positive displacement pump that is driven by the power input member of the transmission system. Conduit structure connects the servos with the pressure source.

The conduit structure includes fluid pressure distributor valves that sense the driven speed of the drive member as well as the torque delivered to the driving member.

In vehicle installations in which the power source is an internal combustion engine, the torque sensitive signal may be developed by a vacuum modulator that is operated by engine intake manifold pressure. The modulator, which is supplied with input pressure by the pressure source, produces a pressure signal that is proportional in magnitude to engine manifold pressure. This pressure, together with the speed-pressure signal, is effective to cause automatic ratio changes as the signals act on the pressure distributor valves.

The speed signal in the valve circuit of my invention is developed by a simplified orificing governor comprising a rotary valve body having an orifice that discharges into a low pressure exhaust region. The orifice is supplied by a governor feed passage extending through the valve body. The orifice is arranged in registry with a movable valve element that responds to centrifugal force as the valve body is rotated by the driven member. Upon an increase in speed, the centrifugal force is increased thereby restricting the flow through the orifice to a degree that depends upon the driven speed. At low speeds the orifice offers a relatively small resistance to the passage of fluid. At high speeds the valve increased the restriction to a degree that will permit only a slight loss of fluid through the orifice.

The feed passage extending to the governor orifice communicates with the pressure source. Situated in the feed passage is a governor feed control valve that establishes a constant rate of flow through the feed passage regardless of the speed of rotation of the governor valve body.

The governor feed control valve is effective to maintain an accurate speed signal, which is indicated by the back pressure on the upstream side of the governor orifice, even at low speeds of rotation when an excess of leakage through the governor orifice tends to occur. The governor feed valve is effective also to develop a reliable signal that approaches in magnitude the pressure supplied by the pump when the speed is at a maximum. It is at this time that the flow restriction of the centrifugally responsive valve is at a maximum. But regardless of the resulting reduction of flow through the orifice, the speed signal is a reliable indicator of the actual speed in the higher speed range.

BRIEF DESCRIPTION OF THE FIGURES OF THE DRAWING

FIG. 1 is a schematic assembly view of an automatic power transmission mechanism which embodies the improved circuitry of my invention.

FIG. 2 is a schematic valve circuit showing the principal components of the governor circuit of my invention.

FIG. 3 is an enlargement of a portion of the circuit of FIG. 2.

PARTICULAR DESCRIPTION OF THE INVENTION

In FIG. 1, numeral 10 designates an internal combustion engine for an automotive vehicle driveline. It includes an intake manifold which is supplied with an air-fuel mixture by carburetor 12.

The transmission system forms torque delivery paths between the engine 10 and the traction wheels or road wheels 14. The crankshaft of the engine is connected directly to the impeller 16 of a hydrokinetic torque converter 18. The converter includes also a bladed turbine 20 and a bladed stator 22 which, together with the impeller 16, are situated in toroidal fluid flow relationship. A stator is supported by a stationary sleeve shaft 24. An overrunning brake 26 forms a one-way connection between stator 22 and sleeve shaft 24. The turbine 20 is connected to turbine shaft 28, which delivers torque to clutch drum 30. This drum supports clutch discs which cooperates with other clutch discs to define a forward drive clutch 32. Drum 30 includes a portion 34 which carries friction discs that cooperate with the clutch discs forming a part of a direct and reverse clutch assembly 36. Surrounding the clutch 36 is a brake band 38 which is applied during intermediate speed ratio by an intermediate servo.

Clutch 32 includes a member 40 which is connected to ring gear 42 of a planetary gear unit 44. A second planetary unit 46 includes a ring gear 48 and a carrier 52 on which are journaled pinions 51. A carrier 50 for the gear unit 44 journals pinions 54. Both carriers 52 and 50 are connected to power output shaft 62, which in turn is connected by means of a drive shaft and a differential and axle assembly to the road wheels 14. Sun gear 58 is common to both gear units 44 and 46.

Drive shell 60 serves as a driving connection between the driven member of clutch 36 and the sun gear 58.

Brake band 64 surrounds the drum that is defined by the carrier 52. Carrier 52 is anchored by overrunning brake 68 to the transmission housing portion 66 so that it is free to rotate in one direction. Freewheeling motion in the opposite direction is prevented by the brake 168. Reaction torque in both directions can be accommodated by brake band 64, which is applied during manual low-speed ratio operation and during reverse drive operation.

The governor, which is indicated at 70, is connected to the power output shaft 62 and rotates in unison with it. The clutch 32, which is applied during forward drive operation, includes a clutch servo cylinder 72 and a cooperating annular piston 74. The pressure chamber defined by the cylinder 72 and the piston 74 is fed with actuating pressure through feed passage 73. The direct-and-reverse clutch 36 includes a servo cylinder 78 and a cooperating piston 76 which define an annular pressure chamber that is fed with control pressure feed passage 75.

During low speed ratio operation clutch 32 is applied. The engine drives the impeller of the converter 18 thereby establishing a turbine torque which is distributed through the applied clutch 32 to the ring gear 42. A forward driving torque then is imparted to the output shaft 62 through the gear unit 44.

Sun gear 58 at this time is driven in a reverse direction, thereby imposing a reaction torque on the carrier which is distributed to the transmission housing through the overrunning brake 68. This results in a forward driving motion of the ring gear 48. This motion is distributed to the output shaft 62, thereby defining a parallel torque delivery path through the gear units.

If engine braking is desired of if continuous operation in the low-speed ratio range is desired, the manual low and reverse band 64 can be applied by actuating the reverse and low servo.

To effect a ratio change from the low speed-ratio to the intermediate-speed ratio, brake band 64 is released and brake band 38 is applied. This anchors the sun gear 58. The forward clutch 32 remains applied. Thus turbine torque again is delivered to the ring gear 42. The sun gear 58 acts as a reaction point as the carrier 50 is driven. The overrunning brake 68 now free wheels, thus rendering the gear unit 46 inactive.

A ratio change to the high speed ratio from the intermediate speed ratio is accomplished by disengaging the brake band 38, keeping the brake band 64 released and simultaneously applying both clutches. The elements of the gearing thus are locked together for rotation in unison as a 1:1 ratio torque delivery path is established.

Reverse drive is achieved by disengaging the clutch 32 and applying the clutch 36 at the same time brake band 64 is applied. Turbine torque then is delivered through the clutch 36 and through the drive shell 60 to the sun gear 58. With the carrier 52 acting as a reaction point, sun gear 58 drives a ring gear 48 in a rearward direction. This rearward motion is transmitted to the power output shaft 62. Gear unit 44 does not function at this time.

In FIG. 2 the orificing governor valve assembly is identified by reference character 70. It includes a primary governor valve 82 and a secondary governor valve 84. They are situated in a governor valve body 86, which is connected drivably to the power output shaft 62. A governor feed passage 88 communicates with the valve body 86. This passage is in fluid communication with the positive displacement pump 80, which is driven by the engine through the converter impeller.

Primary governor valve element 82 is slidably situated in a radial valve chamber 90. The radially outward end of the chamber 90 communicates with the feed passage 88 through a valve port 92 and a communicating branch passage 94. The radially outward region of the chamber 90 is exhausted through an exhaust port 96. A valve spring 98 provides a continuous, radially inward force on the valve 82 tending normally to open the port 92. As the valve body 86 is rotated, the centrifugal force developed by reason of the rotary motion of the valve 82 and its mass cause the port 92 to be restricted.

Valve 84 is situated slidably in a radially disposed valve chamber 100. It normally is urged by valve spring 102 into sealing engagement with valve port 104. This port communicates through branch passage 106 with the feed passage 88. The outer region of the chamber 100 is exhausted through exhaust port 108.

Communication is established between feed passage 88 and the pump 80 through a governor feed valve 110. This includes a valve spool 112 having spaced valve lands 114 and 116, which are situated slidably in a valve chamber 118. Internal valve lands in chamber 118 register with the lands 114 and 116.

Pump 80 communicates with the central region of the chamber 118 through control pressure passage 120. Branch passage 122 extends from the passage 88 to the chamber 118 at a location adjacent land 116. A feedback passage 124 distributes pressure from the downstream side of the valve 110 to the right-hand end of the valve element 112. A damper passage 126 distributes pressure from passage 88 to the left-hand side of the valve element 112, thus supplementing the valve actuating force of the valve spring 128.

Passage 126 is provided with a damper orifice 130. A flow control orifice 132 is situated in the passage 122.

Valve 110 is adapted to maintain a constant pressure differential between the passages 120 and 88. This constant pressure differential results in a constant flow from the pump 80 to the passage 88 regardless of the speed of rotation of the governor 70.

At low speeds of rotation of the governor 70, there is a tendency for the pressure in passage 88 to fall to a zero value because of the inability of the primary governor valve 82 to maintain the port 92 sealed. Thus an increased flow into the passage 88 and hence into the governor 70 is required in order to maintain a given back pressure in passage 88. Without the additional flow, a reliable speed signal would not be obtained at low speeds of rotation and the circuit functions performed by the pressure distributor valves in the control system would not be available.

It is necessary, however, to prevent an open circuit condition which would allow circuit pressure to be exhausted through the relatively open governor orifices. This would render the pump 80 incapable of satisfying the circuit pressure requirements. On the other hand at high speeds of rotation the governor valve elements tend to restrict the fluid flow through the governor orifices. This develops an increased back pressure in passage 88 which, as before explained, can be utilized as a speed signal. At the high speed operating range for the governor, a small amount of leakage might tend to result in a false reading. It is necessary, therefore, for the governor feed valve 110 to provide an increased degree of communication at that time between the pump 80 and the passage 88 so that the back pressure developed in passage 88 will more closely approach the maximum circuit pressure made available by the pump.

The governor feed valve functions to provide a constant flow to the feed passage 88 thereby avoiding the tendency of the governor to develop an open circuit condition at low speeds as well as enabling the governor to develop a reliable speed signal at high speeds. It does this by providing a variable degree of communication between the upstream side of the orifice 132 and the pump 80.

As the speed of rotation of the governor 70 increases, the pressure on the downstream side of the orifice 132 will increase. This results in an increase in the degree of communication provided by land 116 between passages 120 and 122. Thus, an increase in the pressure on the downstream side of the orifice 132 is matched by a corresponding increase in the pressure on the upstream side of the orifice 132. Conversely, a decrease in the pressure in passage 88 relative to the pressure in passage 122 will tend to cause valve element 112 to shift in a direction that will increase the degree of restriction provided by land 116 between passages 120 and 122.

The signal developed in passage 88 is a reliable speed indicator, and it is distributed through governor passage 134 to the pressure distributor valve 136, which controls the pressure distribution from the pump 80 to the transmission servos, as indicated in FIG. 1.

A second pressure signal made available to the pressure distributor valve 136 is supplied by the vacuum modulator 138. This includes a valve chamber 140 in which is slidably situated valve element 142. Passage 120 communicates directly with the chamber 140 adjacent land 144 on the valve element 142. A companion valve land 146 controls communication between passage 120 and an exhaust port 147. An output pressure passage 148 communicates with the chamber 140 at a location between the lands 144 and 146.

A vacuum diaphragm of known construction, which is indicated at 150, establishes a force on valve stem 152 which is distributed to the valve element 142. The force acting on the stem 152 is proportional in magnitude to the engine intake manifold pressure, and thus is an indicator of engine torque. Passage 148 thus receives a pressure signal that is an indicator of engine torque. The feedback pressure from passage 148 is distributed to the left-hand side of the valve element 142 through branch passage 154. The signal in passage 148 is modified by the shift TV valve 156 in the matter described in my opening U.S. Pat. application, Ser. No. 717,203 now U.S. Pat. No. 3,491,622. The output of the valve 156 is distributed in turn to the pressure distributor valve 136.

The driver operated manual valve 158 distributes pressure selectively from the passage 120 to the various circuit regions thereby conditioning the system for any one of several operating modes. Various output pressure passages for the valve 158 are indicated generally at 160.

I claim:

1. In a control valve system including fluid pressure operated servos and a pressure source with pressure distributor valves defining a controlled pressure distribution path between the pressure source and the servos, said servos forming a part of a geared torque delivery system capable of transmitting driving torque from a driving member to a driven member, a governor valve assembly adapted to develop a pressure signal proportional in magnitude to the driven speed of said driven member, said governor valve assembly comprising a governor valve body connected to said driven member, a radial valve port in said valve body, a radial valve opening extending radially from said valve port, a movable valve element slidably situated in said valve opening and adapted to register with said port, said valve element, upon rotation of said valve body, progressively sealing said valve port, a governor feed passage communicating with said valve body and extending to said port, governor feed valve means for establishing controlled communication between said pressure source and said feed passage including a governor feed valve chamber, a valve element in said valve chamber, a flow control orifice communicating with said feed passage on its downstream side, a governor feed valve port on the upstream side of said flow control orifice communicating with said valve chamber, a valve land on said valve element registering with said port, a valve spring acting on a said valve element and urging the same toward an open port position, the upstream side of said orifice communicating with said valve element to establish a pressure force that opposes the force of said spring, and branch passage means for distributing pressure from said feed passage to said valve element to supplement the action of said spring.

2. The combination as set forth in claim 1 wherein said governor valve comprises a second high speed valve element, a high speed valve orifice in said valve body, a branch passage connecting said high speed valve port and said feed passage, a valve element registering with said high speed valve port, and spring means for normally moving said high speed valve element toward a port closing position, said high speed valve element being urged toward an open port position as a back pressure in said feed passage develops to a value greater than a predetermined brake point value.

UNITED STATES PATENT OFFICE
CERTIFICATE OF CORRECTION

Patent No. 3,542,046                Dated November 24, 1970

Inventor(s)              Richard D. Moan

It is certified that error appears in the above-identified patent and that said Letters Patent are hereby corrected as shown below:

Column 2, line 33, cancel "168" and substitute --68--.

Column 6, line 4, after "valve" (first occurrence) inse --assembly--; line 6, cancel "a" and substitute --said high speed governor--.

Signed and sealed this 21st day of September 1971.

(SEAL)
Attest:

EDWARD M. FLETCHER, JR.                ROBERT GOTTSCHALK
Attesting Officer                       Acting Commissioner of Pate